US007555196B1

(12) United States Patent
Crawford et al.

(10) Patent No.: US 7,555,196 B1
(45) Date of Patent: Jun. 30, 2009

(54) METHODS AND SYSTEMS FOR SYNCHRONIZING TIMECODES WHEN SENDING INDICES TO CLIENT DEVICES

(75) Inventors: Jeffrey D. Crawford, San Francisco, CA (US); Thomas H. Taylor, Redmond, WA (US); Peter J. Potrebic, Calistoga, CA (US)

(73) Assignee: Microsoft Corporation, Redmond, WA (US)

( * ) Notice: Subject to any disclaimer, the term of this patent is extended or adjusted under 35 U.S.C. 154(b) by 1552 days.

(21) Appl. No.: 10/247,995

(22) Filed: Sep. 19, 2002

(51) Int. Cl.
*H04N 5/91* (2006.01)
*H04N 5/44* (2006.01)
*H04N 5/225* (2006.01)
*H04N 5/445* (2006.01)
*H04N 7/00* (2006.01)
*H04N 7/12* (2006.01)
*H04N 7/16* (2006.01)
*H04N 7/18* (2006.01)
*H04N 7/26* (2006.01)
*H04N 7/173* (2006.01)
*H04J 3/02* (2006.01)
*H04J 3/06* (2006.01)
*H04J 3/24* (2006.01)
*G06F 17/00* (2006.01)
*G11B 27/00* (2006.01)

(52) U.S. Cl. ............... 386/46; 386/52; 386/65; 386/69; 386/124; 348/170; 348/561; 370/474; 370/510; 370/537; 375/240.28; 707/104.1; 725/60; 725/80; 725/109; 725/139; 725/145; 725/146

(58) Field of Classification Search ............ 386/46, 386/69, 52, 65, 124; 348/170, 561, E5.007, 348/E5.108; 358/908; 370/474, 537, 150, 370/510; 375/240.28, E7.003, E7.008, E7.024, 375/E7.004, E7.272; 707/104.1, E17.026, 707/E17.028; 725/60, 139, 80, 109, 145, 725/146
See application file for complete search history.

(56) References Cited

U.S. PATENT DOCUMENTS

| 5,610,653 | A  | * | 3/1997  | Abecassis        | 348/170  |
|-----------|----|---|---------|------------------|----------|
| 6,233,389 | B1 | * | 5/2001  | Barton et al.    | 386/46   |
| 6,357,042 | B2 | * | 3/2002  | Srinivasan et al.| 725/32   |
| 7,114,172 | B2 | * | 9/2006  | Lord             | 725/80   |
| 7,174,560 | B1 | * | 2/2007  | Crinon           | 725/60   |
| 7,177,520 | B2 | * | 2/2007  | Zetts            | 386/52   |
| 2001/0018693 | A1 | * | 8/2001  | Jain et al.   | 707/500  |
| 2002/0012361 | A1 | * | 1/2002  | Houtepen et al.| 370/474 |
| 2003/0185541 | A1 | * | 10/2003 | Green         | 386/46   |
| 2004/0117405 | A1 | * | 6/2004  | Short et al.  | 707/104.1 |
| 2004/0128317 | A1 | * | 7/2004  | Sull et al.   | 707/104.1 |

* cited by examiner

*Primary Examiner*—Thai Tran
*Assistant Examiner*—Syed Y Hasan
(74) *Attorney, Agent, or Firm*—Lee & Hayes, PLLC

(57) ABSTRACT

Methods and systems for indexing programs are described. In accordance with one embodiment, program data associated with a program recorded on a first entertainment system is processed sufficient to create one or more signatures. The signatures define points of reference that can be utilized to synchronize timecodes associated with other recorded versions of the program from which the signatures were created. One or more indices are created and associated with the program from which the signatures were created. An index file can be created and can contain the created indices as well as the created signatures. A client system that receives the index file can use the signatures to synchronize the timecode on its recorded version of the program with a timecode of the program from which the signatures were created. Once the timecodes are synchronized, the client system can locate the same indices on its recorded version of the program.

72 Claims, 8 Drawing Sheets

METHODS AND SYSTEMS FOR SYNCHRONIZING TIMECODES WHEN SENDING INDICES TO CLIENT DEVICES

TECHNICAL FIELD

This invention relates to systems and method for indexing programs.

BACKGROUND

The notion of indexing a recorded program has recently become a popular concept with makers of personal video recorders (i.e. PVRs), also known as digital video recorders or "DVRs". According to this concept, software executing on an author's entertainment system starts with a recorded program (for example a football game) and enables the author to make notes of key locations (also referred to as "indices") within the program. So, for example, perhaps the author provides indices for the following events within the football game: all plays, all third down plays, all touchdowns, and exciting plays of interest. Typically these indices are defined in terms of some unit, such as offsets in seconds or milliseconds, from the start of the program.

Once the indices are defined and provided into an index file, the index file can be sent electronically to one or more different clients, also referred to as entertainment systems. So, for example, an author can index a program and then send the corresponding index file to their friends so that they can all enjoy the program as indexed by the author. When a client receives an index file containing the author's indices, if the client's user has recorded the same program, then the index file can be associated with, or otherwise attached to the recorded program's video content. When the user plays back the recorded program, an additional user interface can be presented which allows the user to skip to the key locations in the program, as defined by the author's indices.

While index files can provide great utility for their users insofar as personalizing recorded programs is concerned, receiving and processing index files can create problems that can, if left unaddressed, lead to errors that can impact the enjoyment and utility that can be derived from index files and their use.

For an illustration of but one problem that can lead to errors, consider FIG. 1 which illustrates an error that can arise when an author's program recording (here, user 1's program recording) starts slightly before the actual program is broadcast, and the index file recipient's program recording (here, user 2's program recording) starts slightly after the actual program is broadcast. Specifically, the box designated "Actual Program Timecode" depicts the actual timecode that is associated with the program that is broadcast. Notice the dashed line that extends downward from this box is designated "Actual Start" which designates the actual starting time of the broadcast. Notice, however, that user 1's program recording is actually started somewhat earlier than the actual broadcast—perhaps this recording picks up a previously-broadcast commercial. The portion of user 1's recording that is somewhat earlier than the actual program is designated by the cross-hatching. Notice also that user 2's program recording starts slightly after the actual start of the program.

If user 1 provides an index file having individual indices that are measured from a reference timecode that starts at the beginning of the physical recording (i.e. at User 1's Start), then the indices will be calculated to have an amount of time that is attributable to the crosshatched area of user 1's program recording. When user 1 sends their index file to user 2, assume that the reference timecode that is used is that which starts at the beginning of the recording. Since user 2 started their program recording somewhat later (perhaps 5 seconds after the actual beginning of the program broadcast), user 1's indices will be mapped to a different location of user 2's program recording. For purposes of example, individual indices are depicted by the small, downwardly-pointing arrows. Each index mapping from user 1's program recording to user 2's program recording is shown by the dashed arrow that extends therebetween.

Accordingly, the indices will not be synchronized and will point to locations in user 2's program recording that are incorrect. For example, if user 1 indexed a touchdown, user 2's corresponding index might point to the subsequent kick-off return.

There are other situations that can lead to errors as well. For example, the different stations or sources from which programs are broadcast can have hardware dissimilarities that can cause delays as between seemingly identical, but differently-broadcast programs. Errors can also be introduced by the system clocks of the devices that either index or attempt to use an index. For example, if a system's clock is not entirely accurate, errors can find their way into the index file. Additionally, the same program can be aired in different time slots and, within any one particular broadcast, there can be a delay that can lead to synchronization problems.

Accordingly, this invention arose out of concerns associated with providing improved methods and systems for enabling exchange and use of index files.

SUMMARY

Methods and systems for synchronizing timecodes when sending indices to client devices are described. In accordance with one embodiment, program data associated with a program recorded on a first entertainment system is processed sufficient to create one or more signatures. The signatures define points of reference that can be utilized to synchronize timecodes associated with other recorded versions of the program. One or more indices are created and associated with the program from which the signatures were created. An index file can be created and can contain the created indices as well as the created signatures. The index file can be electronically exchanged with one or more client systems. A client system that receives the index file can use the signatures to synchronize the timecode on its recorded version of the program with a timecode of the program from which the signatures were created. Once the timecodes are synchronized, the client system can locate the same indices on its recorded version of the program.

DETAILED DESCRIPTION

Overview

The inventive principles described below can be used in conjunction with any suitable type of entertainment system, such as a home entertainment system. In the discussion that follows, reference will be made to an entertainment system that may be used for displaying and/or recording programs. Within the context of this document, an "entertainment system" can be a display unit, such as a television screen, coupled to a processing device for performing the data processing steps disclosed herein, or can include any number of interconnected consumer electronic devices, one of which having a processing device for performing the data processing steps disclosed herein. Examples of such consumer electronic devices include, without limitation, a video cassette recorder ("VCR"), a personal video recorder (PVR), a digital video recorder (DVR), a video game system, a stereo system, a television or monitor with data processing capabilities, a cable television box, a digital satellite system receiver ("DSS"), a digital video broadcasting system ("DVB"), a digital versatile disc system ("DVD"), a set-top box that serves as an Internet terminal, and any other device capable of processing data as described herein. Additionally, an entertainment system can comprise a system such as a personal computer running software such as Windows XP Media Center Edition. Furthermore, the term "entertainment system" is to be understood as a term that broadly describes a television-viewing environment, whether it is located in a viewer's home, at a place of business, in the public, or at any other location. Also, in the context of this document, the term "program" and "program data", as such pertains to broadcast programs includes, when appropriate, both the viewable portions of moving image data (i.e. video data) and its associated sound data (i.e. audio data). In addition, program data can also include other types of data that are typically associated with image and sound data. Examples of such other types of data include, without limitation, closed captioning data, and the like.

In one exemplary implementation context, the various embodiments can be implemented in a system that uses a conventional television screen or other display unit to display information and can include, as an example, an UltimateTV® set-top box or a similar Internet terminal that has been adapted to perform the operations that include composing, sending and receiving email, browsing the World Wide Web ("Web"), accessing other segments of the Internet, and otherwise displaying information. An Internet terminal typically uses standard telephone lines, Integrated Services Digital Network (ISDN) lines, cable lines associated with cable television service, satellite, or the like to connect to the Internet or other wide area networks.

Figure 7:
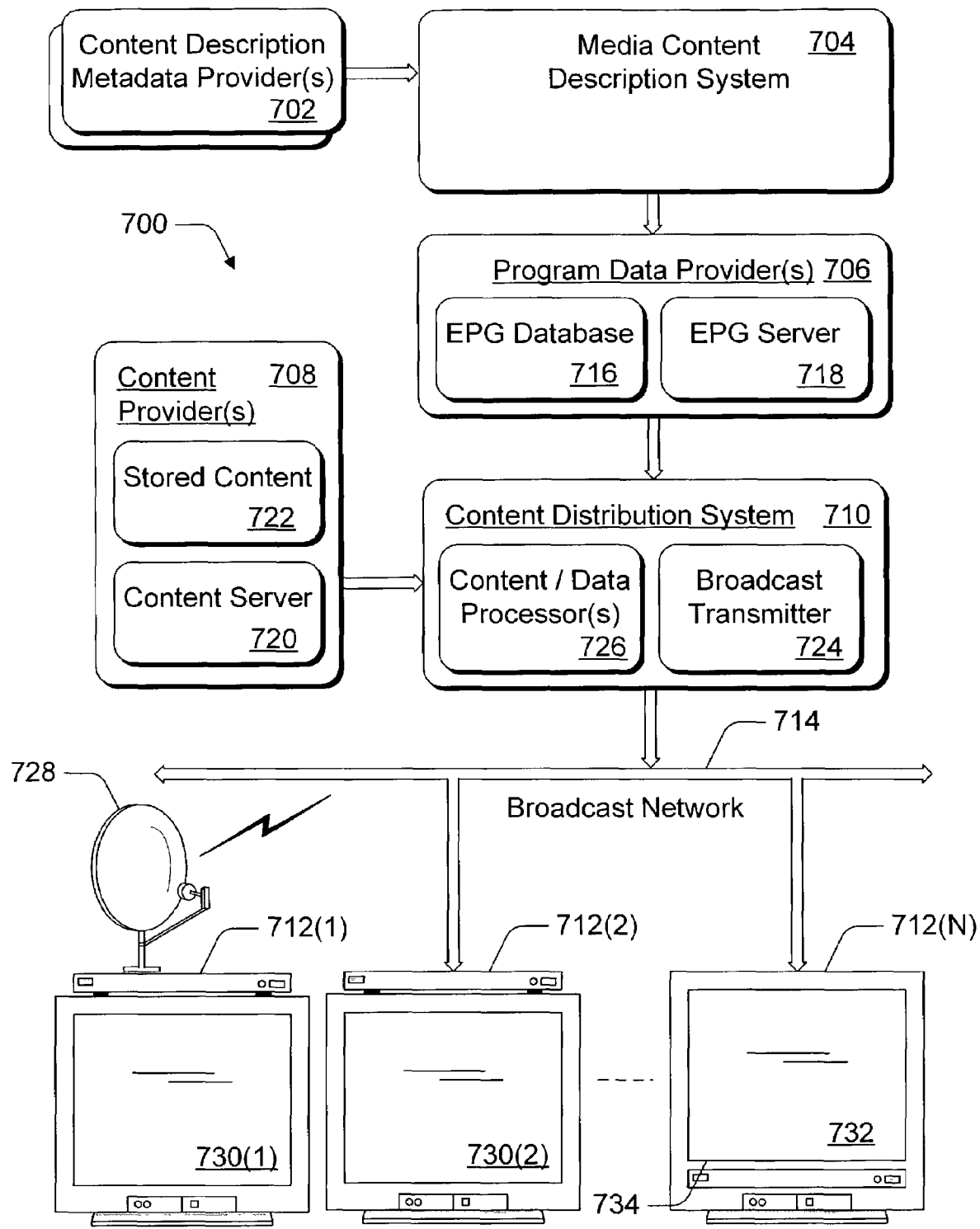
FIG. 7 is a block diagram of an exemplary environment in which one or more of the inventive embodiments can be implemented.
Figure 8:
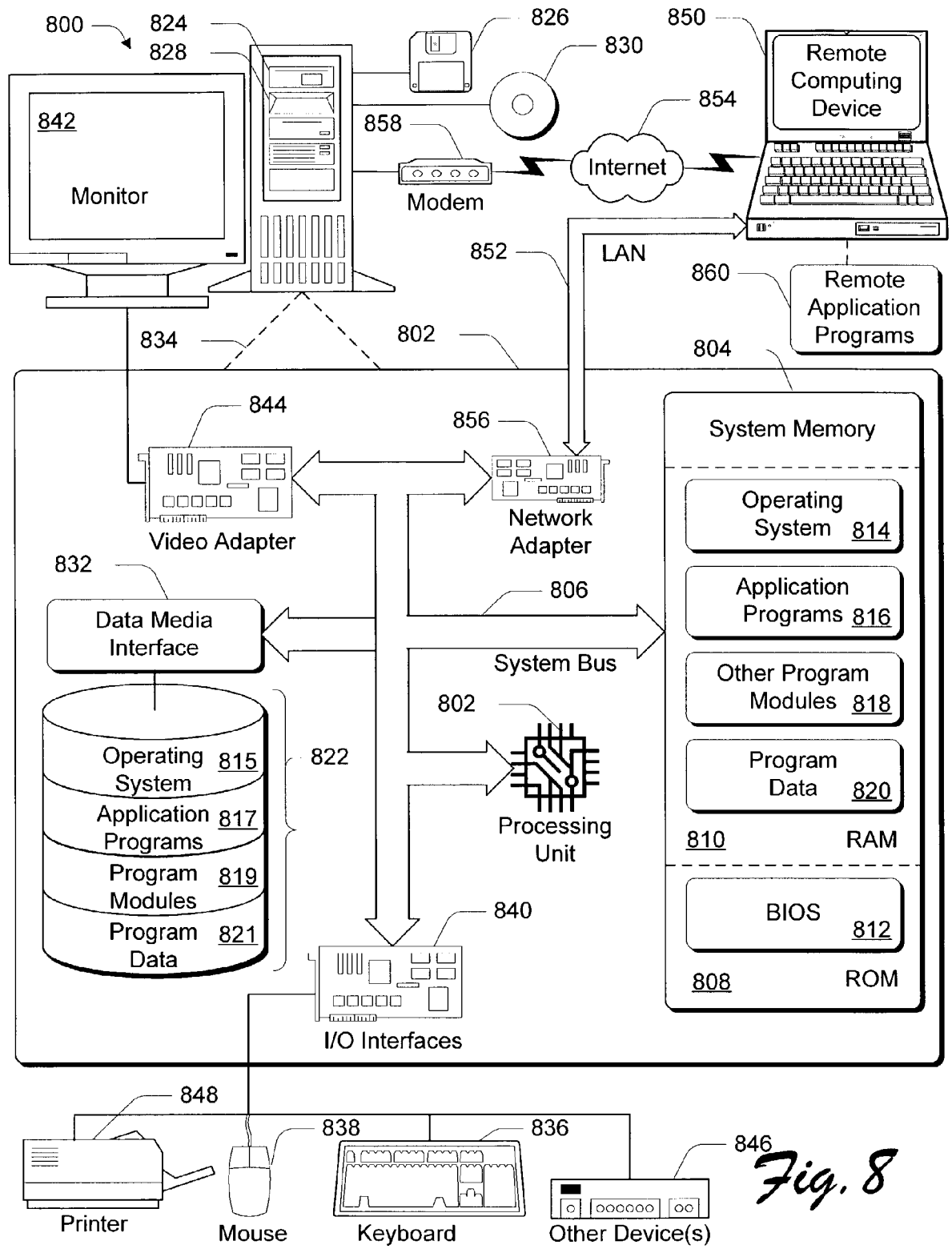
FIG. 8 is a block diagram of an exemplary computer or client device that can be used to implement one or more embodiments.

At the end of this document, FIGS. 7 and 8 illustrate but one exemplary system to provide the reader with an understanding and appreciation of one system that is capable of implementing the embodiments described herein. It is to be appreciated and understood that the description of this exemplary system is not intended to limit application of the claimed subject matter.

Synchronizing Timecodes with Program Data Signatures

In accordance with one embodiment, software executing on an entertainment system processes program data that is associated with a program that has been recorded by a user. The program need not, however, be recorded on an entertainment system for purposes of the processing that is described below. Rather, the processing steps described below can be performed, for example, by a third party service or some other entity.

The program has an associated timecode which corresponds to the time over which the program was or is broadcast. The software processes the program data and creates one or more signatures. A signature can be made up of one or more component parts. For example, a single signature that is built from video data, as described below, can have multiple components each of which consist of a scene change. The signature(s) is used to define a point (or points) of reference that is used to synchronize timecodes associated with different recordings (i.e. different recorded versions) of the same program. Once timecodes as between the different recordings of the same program are synchronized, one or more of the indices that were defined using a first of the recordings can be easily identified in a second of the recordings. Advantageously, signature-defining software that is utilized by an author in connection with defining various indices for a recorded program on one client device, can be used on client devices to which the author's index file is forwarded. That way, signatures for the recorded program can be created and then used in a timecode synchronization process whose ultimate effect is to allow indices that are defined relative to a first program recording to be easily identified in a second program recording whose timecode may be different from the timecode of the first program recording. Such will become more apparent as the description below is read.

Figure 2:
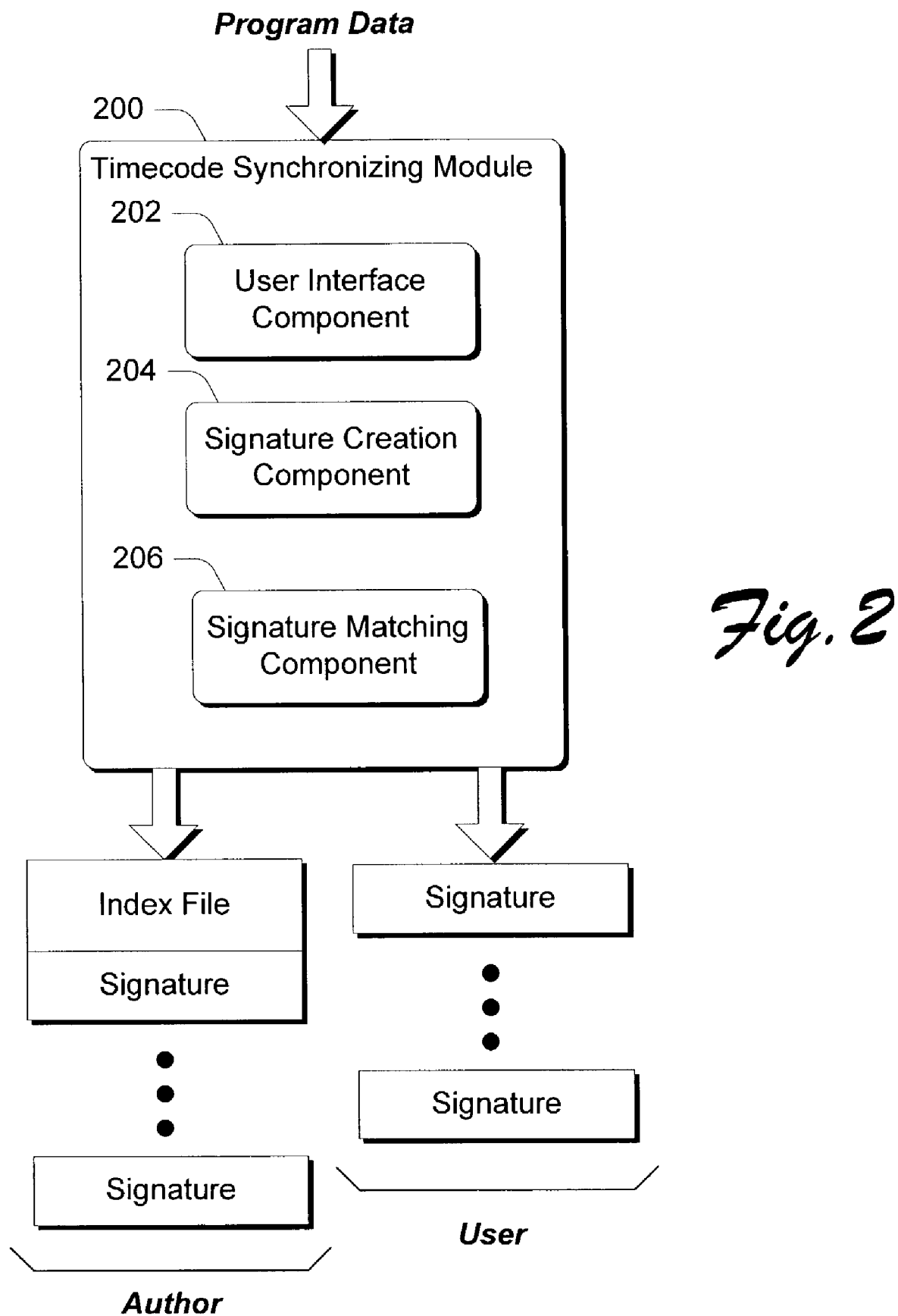
FIG. 2 is a block diagram that illustrates an exemplary timecode synchronizing module in accordance with one embodiment.

FIG. 2 is a high level block diagram of an exemplary timecode synchronizing module 200 that can be utilized in accordance with one embodiment. Although FIG. 2 depicts specific components, the functionality of the system about to be described need not be implemented using the specific components shown. Rather, other implementations can vary from the FIG. 2 system without departing from the spirit and scope of the claimed subject matter. For example, various functionalities about to be described can be combined into one or more different components. In addition, the FIG. 2 system can be implemented in any suitable hardware, software, firmware, or combination thereof.

In the illustrated and described system, timecode synchronizing module 200 can function to enable a user or author to create one or more index files that are associated with programs that are, or can be saved on the author's entertainment system, e.g. on the system's hard drive. Module 200 need not, however, be used exclusively in connection with an entertainment system. Rather, module 200 can be utilized in connection with any entity that desires to create and distribute indices or index files. In this particular example, module 200 comprises a user interface component 202, a signature creation component 204, and a signature matching component 206.

The user interface component 202 can allow an author to select and index different portions of a program and create data that are associated with the selected portions. Such created data can include, without limitation, text, audio, a URL, video (e.g. a small PIP window containing some visual commentary), and the like. Thus, for example, if the author has recorded a football game, the user interface can allow the author to index different portions of the football game (e.g. the kickoff, all third downs, and all touchdowns) and provide textual descriptions of the selected portions. The indices that are defined by the author can be defined relative to one or more points of reference that can be re-calculated in other versions of the recorded program. Typically, the indices are defined in terms of an offset from the point of reference. For example, if a point of reference occurs at the beginning of the broadcast, then the indices can be defined in terms of their distance, in milliseconds, or some other time-based unit, from the point of reference.

Signature creation component 204 is configured to process program data that is associated with the recorded program of interest and creates one or more signatures that are utilized as points of reference. The points of reference are used as a mechanism to synchronize timecodes between different recorded versions of the same program. Once the timecodes are synchronized, indices that are defined for one recorded version of a program can be easily identified in another recorded version of the program. Any suitable methods and any suitable program data can be used to create the signatures that are utilized as points of reference. A few examples are given in the section below entitled "Parsing Program Data to Create Signatures".

For example, in FIG. 2 just beneath module 200 appear an index file and one or more signatures that are associated with the index file. The index file and its associated signature(s) are bracketed by the designation "Author" to indicate that they have been created by software executing on the author's client device. An author can be considered as any entity that creates or causes the creation of an index file and associated signatures. For example, an author can be a end-using customer of the software, a professional content creator, and the like. An author can also be an automated process. For example, an indexing service can automatically parse video data and create an index file. In the case of sports events, the indexing service might be set up to key off of an official's whistle. Thus, every time a whistle is blown, the service might automatically create an index.

Advantageously, module 200 can also be utilized to simply calculate signatures associated with recorded programs, and/or can attempt to match signatures that are received with portions of a different recorded version of the program from which the signatures were created. For example, once an author creates an index file (and its associated signature(s)) and sends the file and signature(s) to another client, the receiving client can use module 200 to process its corresponding recorded program to calculate various signatures. By calculating signatures using its recorded program, the receiving client can now look for places in its program where the signatures associated with the received index file match with signatures that it calculates. Signatures need not, however, be calculated for purposes of finding a match with a received signature. Rather, module 200 can simply look for portions of its associated program that match, in some way, with a signature that is received. One way of how this can be done is given below in the context of closed captioning data.

In this example, signature matching module 206 performs a signature matching function. Once a signature match is found, the timecode associated with the program from which the index file was created can be synchronized with the timecode of the receiving client's recorded program.

Essentially, the signature-matching process and timecode synchronization process can effectively translate one timecode (e.g. that of the program relative to which the index file was created) to another timecode (e.g. that of the program associated with the receiving client) by determining an offset associated with a first of the program recordings, and then applying that offset to a timecode associated with a second program recording. For example, a signature associated with a first recording might occur at a timecode that corresponds with 125 seconds into the first recording. When that same signature is located in a second recording, that signature might occur at 100 seconds into the second recording. Thus, there is a 25-second difference between the signature of the first recording and the signature of the second recording. Accordingly, the receiving client's system can now recognize that each of the indices associated with the first program recording can be found in the second recording by first subtracting 25 seconds from the corresponding timecodes of the indices in the first recording to arrive at a timecode value. The system can then jump to the corresponding location in the second program recording that has that particular timecode value. For example, if the first index occurs in the first recording at a location having a timecode that is 600 seconds into the first recording, the corresponding timecode at which that index occurs in the second recording is 600 seconds−25 seconds=575 seconds. Thus, the system can jump to the location in the second recording that corresponds to a timecode of 575 seconds into the recording.

Accordingly, once the timecodes are synchronized, the indices in the index file can be located within the receiving client's recorded program quite easily.

Figure 1:
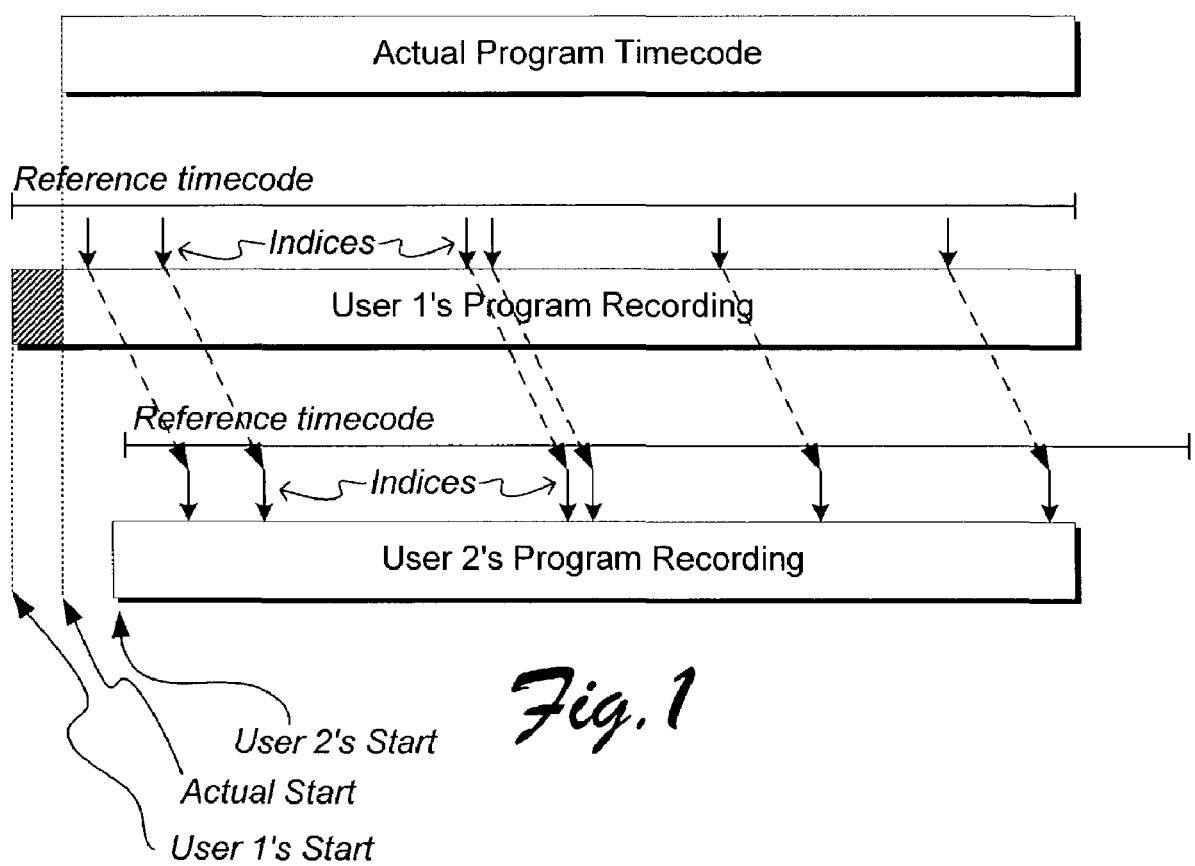
FIG. 1 is a diagram that illustrates two program recordings and how synchronization errors can occur when an index from one recording is attempted to be used with the other recording.
Figure 3:
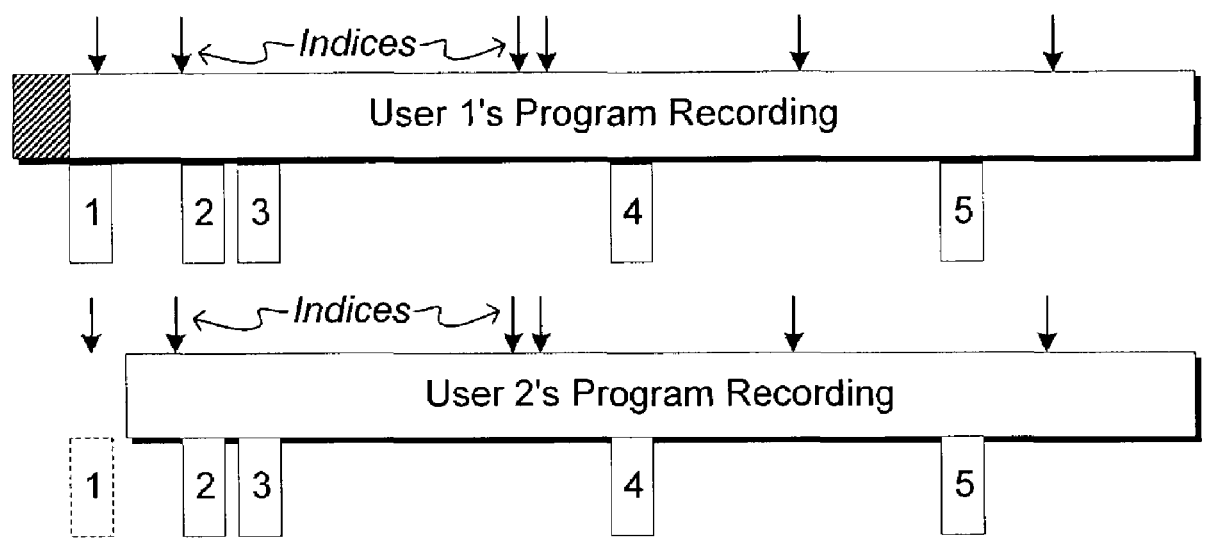
FIG. 3 is a diagram that illustrates two program recordings and how, in accordance with one embodiment, timecodes and hence indices can be synchronized as between the recordings.

As a diagrammatic example, consider FIG. 3. There, the program recordings for users 1 and 2 from the example of FIG. 1 are utilized. Recall that user 1 recorded a small portion before the actual program as indicated by the cross-hatched box, and user 2 started their recording just after the program started. When user 1 creates their index file by, for example, using timecode synchronizing module 200 (FIG. 2), one or more signatures are created from the program data. Here, five such signatures are created over the course of user 1's program recording and are designated as "1", "2", and so on. Assume now that user 2 previously recorded the program of interest, and that user 1 sends to them an electronic copy of the index file that corresponds to the program. When user 2's entertainment system receives the index file, its timecode synchronizing module can create or calculate signatures that correspond to its recorded program and/or attempt to search for and match portions of user 2's program recording with the signatures that correspond to user 1's program recording. Notice here that because user 2 was late in starting their recording, their entertainment system will not be able to find a matching signature for the first signature. User 2's system will, however, calculate signatures and/or search for at least one matching signature of the remaining four signatures using signature matching component 206 (FIG. 2). Once the signatures are matched to a sufficient degree, the timecode synchronizing module can synchronize the timecodes between the two recordings and then conveniently locate indices within the second program recording that correspond to indices within the first program recording.

Parsing Program Data to Create Signatures

As noted above, any suitable methods and any suitable program data can be utilized to provide signatures that can be used to synchronize timecodes. In the example about to be described, three different types of data—video data, audio data, and closed captioning data—can serve individually, or in various combinations with one another, as a basis to create signatures and thus synchronize timecodes.

Figure 4:
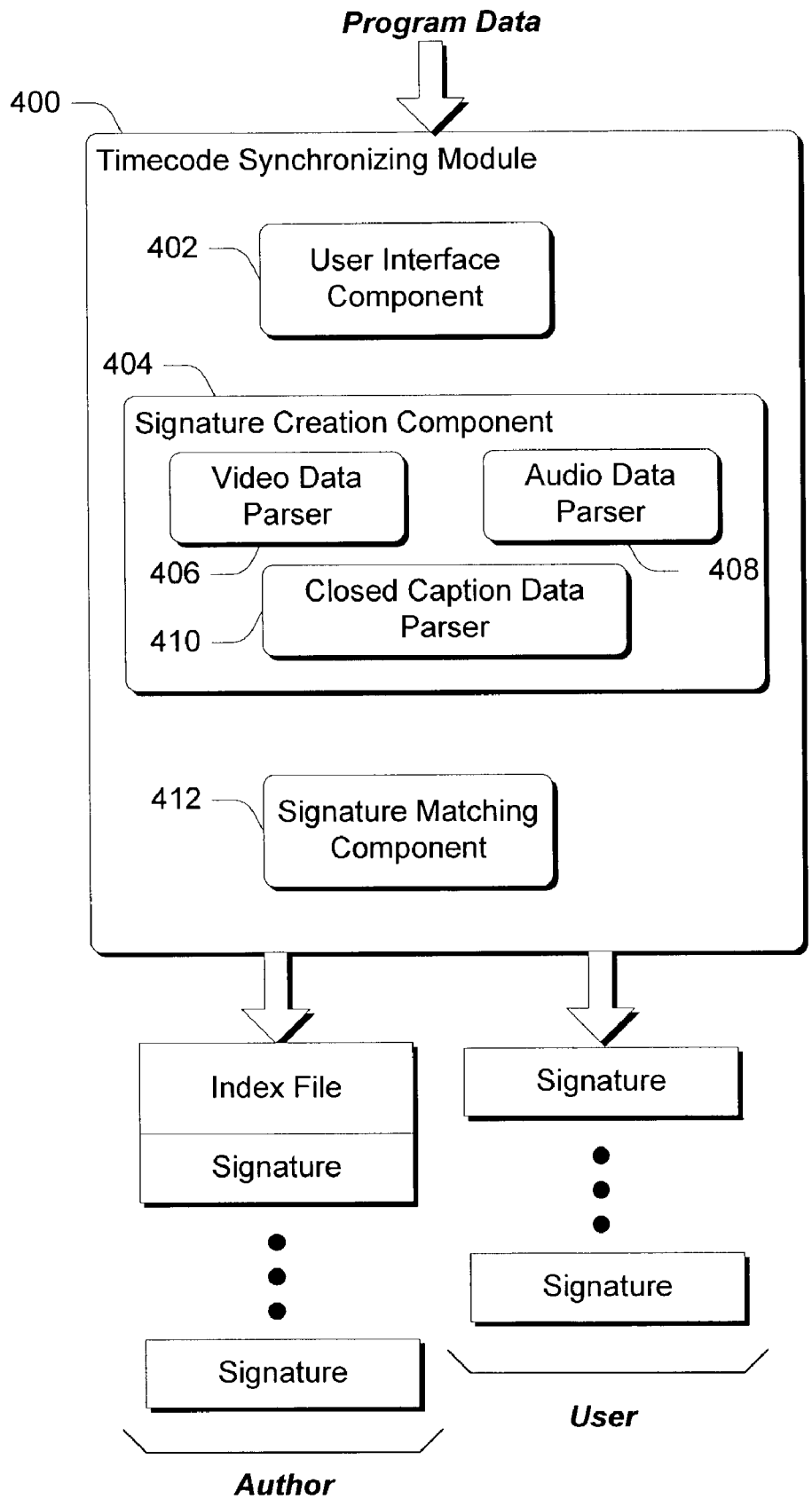
FIG. 4 is a block diagram that illustrates an exemplary timecode synchronizing module in accordance with one embodiment.

FIG. 4 is a high level block diagram of an exemplary timecode synchronizing module 400 that can be utilized in accordance with one embodiment. Although FIG. 4 depicts specific components, the functionality of the system about to be described need not be implemented using the specific component shown. Rather, other implementations can vary from the FIG. 4 system without departing from the spirit and scope of the claimed subject matter. In addition, the FIG. 4 system can be implemented in any suitable hardware, software, firmware, or combination thereof.

In the illustrated and described system, timecode synchronizing module 400 can function to enable a user or author to create one or more index files that are associated with programs that, in some embodiments, are or can be saved on the author's entertainment system, e.g. on the system's hard drive. In this example, module 400 comprises a user interface component 402, a signature creation component 404, and a signature matching component 412.

User interface component 402 can function in the same way as user interface component 202 in FIG. 2 above. Signature creation module 404 includes a video data parser 406, an audio data parser 408, and a closed captioning data parser 410. These parsers can work together with one another or separately to calculate or otherwise create signatures associated with the program data. Signature matching component 412 functions to match signatures that are received with an index file, to corresponding signatures that are created by the signature creation component from, or searched for within, a recorded program that the receiving client has saved.

In addition to handling signature creation and matching, the timecode synchronizing module (or some other component) can also typically handle other types of data for the purpose of searching for and identifying programs for which an index file and signatures have been received. Such data can include, without limitation, EPG-type information about the recording such as broadcaster, date and time, channel number, program title, and the like. This data can be included inside of the index file, or it can exist as its own separate file which is sent.

Additionally, in some embodiments, timecode synchronizing module 400 is flexible or extendible such that other parsers can be added. These parsers can include, without limitation, HTML parsers, InteractiveTV parsers, TeleText parsers, or any other parsers for parsing data that is provided with the signal. Furthermore, one user's recording of the program might not include all the types of data from which signatures found in the original index were made. In this situation, the timecode synchronizing module is smart enough to use whatever data and parsers are available in order to match signatures.

Video Data Parser

The video data parser can parse video data in any number of ways which will be understood and appreciated by those of skill in the art. Accordingly, for the sake of brevity, specific parsing methods are not explored in great detail here. However, one way of parsing video data is to parse the data and look for scene changes or shot boundaries. One way of doing this, in the context of MPEG content, is to detect and hash I frames of the MPEG content. The signature posted can thus be defined as a series of scene transitions around the first index or any of the subsequent indices. For additional general information on video data parsing and shot detection, the reader is referred to the following U.S. Pat. Nos. 6,393,054; 5,635,982; 5,606,655; 5,521,841; and 5,911,008.

Audio Data Parser

The audio data parser can parse audio data in any number of ways which will be understood and appreciated by those of skill in the art. Accordingly, for the sake of brevity, specific parsing methods are not explored in great detail here. However, one way to parse the audio data is to select one or more locations within the source video. For example, a location that is five minutes into the source video can be selected. At this location, the parser and signature creation component can look over a 10-second segment and sample the segment every ¼ second for the volume, pitch, or some other parameter that is typically used for sampling audio data. Doing so will provide a stream of values that can be used as a signature for the program.

Closed Caption Data Parser

If the program data includes closed caption data, then parsing such data and creating a signature based on this data can be fairly straight forward. For example, the closed caption data parser can simply look for the occurrence of words associated with the program data. For example, if at a particular location in the program data the parser finds a fairly distinctive word or collection of words, such word or collection can be used as a signature. Thus, if the closed caption data includes the words "Hello, today we will begin a new . . . ", then if this word collection is distinctive enough, it can be used as a signature.

Using Multiple Types of Data to Formulate Signatures

As noted above, a single data type can be used to create a signature. For example, the video data itself might be the sole source of the signature or signatures that are created for a recorded program. Alternately, multiple signatures can be created using two or more different types of data. Understandably, this can provide more precision. As an example, consider the following. Program data can be parsed and both the audio and video data can be used to create a signature. For example, a parser can use the video data to determine scene transitions and the audio data to determine differences in audio levels to suggest the locations of commercials. This can yield a series of commercials around one or more of the indices. The signature, in this example, could thus comprise a list of commercials with specific lengths at specific times.

Selecting Signatures Based on Accuracy

In some embodiments, signatures can be selected based on their accuracy as compared with other signatures. Further, signatures that are known to be more accurate than others can, in some embodiments, be weighted more heavily than other signatures that might not be as accurate. For example, closed caption data, if present, can be very precisely parsed with a very low possibility for the loss of data. Accordingly, if an index file includes signatures that are created from both the video data and the closed caption data, the receiving client can opt to use only the closed caption signature, or it can weight the closed caption signature more heavily than the video data signature when it attempts to match the signatures with its own recorded program.

Manual Intervention

Additionally or alternately, an author can manually intervene in the signature creation process. As an example, consider the following. An author can first choose a reference point in the recorded program and capture a screen shot of the reference point. For example, the opening splash screen of a news program can be used as a reference point. In some accompanying notes, the author can record the approximate location of the point of reference and its authored index. The description can say something like "first CNN splash screen after opening commercial break." Upon receiving the index file, the user opens the recorded program, advances to the same location, and clicks a button to manually synchronize the reference point. From this point on, the received indices are then synchronized with the program recorded on the client system.

Exemplary Method

Figure 5:
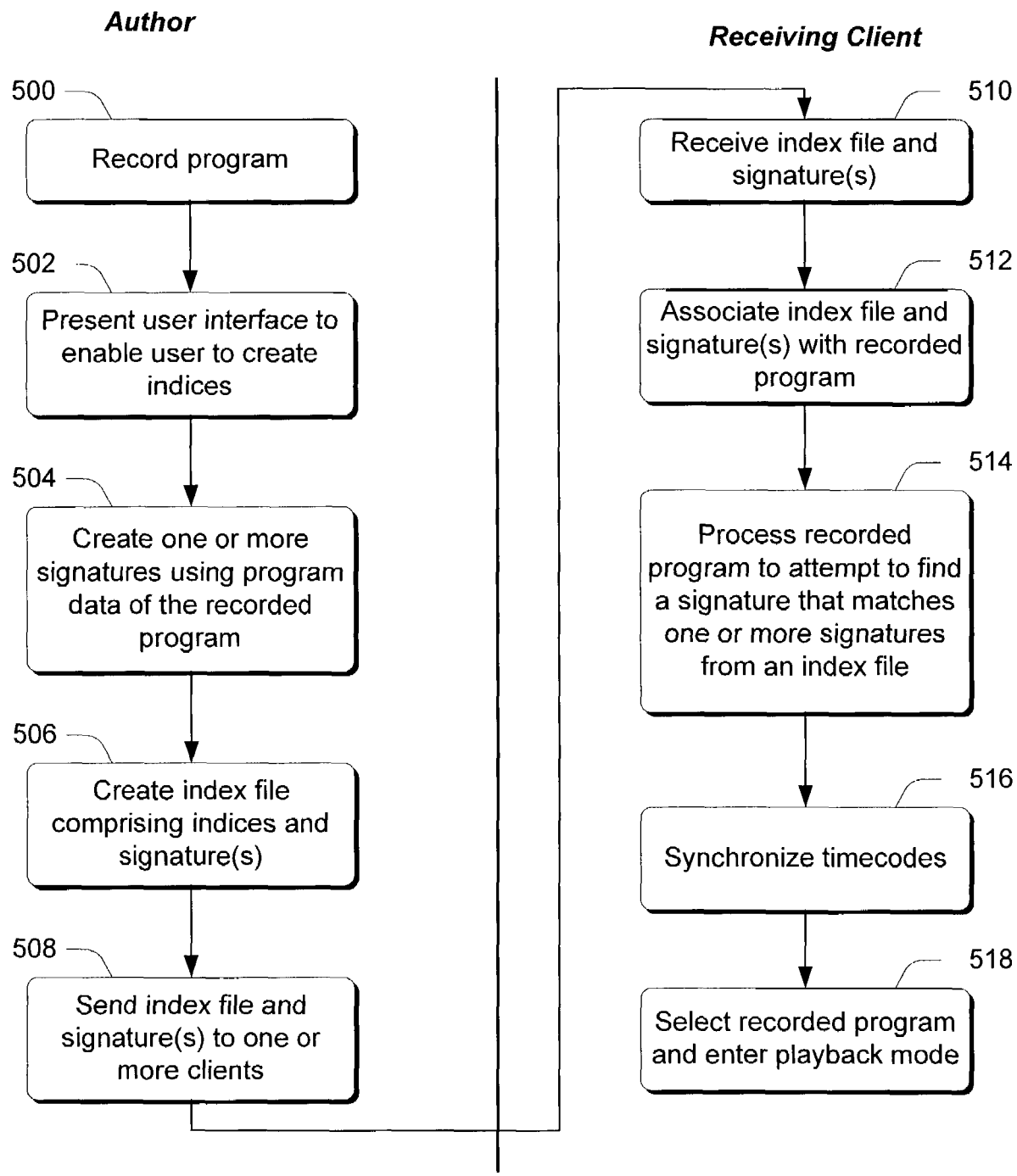
FIG. 5 is a flow diagram that illustrates steps in a method in accordance with one embodiment.

FIG. 5 is a flow diagram that describes steps in a method in accordance with one embodiment. The method can be implemented in any suitable hardware, software, firmware or combination thereof. In one embodiment, the method can be implemented in connection with a system such as the systems shown and described in connection with FIGS. 7 and 8. In this example, the flow diagram is divided into two portions—one labeled "Author" and the other labeled "Receiving Client". The steps that appear underneath the "Author" portion of the flow diagram can be accomplished in connection with an entertainment system that is utilized by the person creating the index file. The steps that appear underneath the "Receiving Client" portion of the flow diagram are accomplished in connection with an entertainment system that is utilized by the person who receives an index file created by the author.

Step 500 records a program. This step can be accomplished by recording the program on a recording medium that is associated with the author's entertainment system, e.g. a hard disk. Step 502 presents a user interface to enable the user to create one or more indices. Here, the user or some automated process decides on the locations of each index. Any suitable user interface can be used. Typically, such an interface will have a portion that displays the program's video, a portion that enables the user to select video segments, and a portion that enables the user to provide a short textual description of the video segment.

Step 504 creates one or more signatures using program data of the recorded program. This step can be implemented using a signature creation component, such as component 404 in FIG. 4. Various types of signatures can be created, examples of which are provided above. In many cases, signatures are created in a manner that is transparent to the user. That is, the system typically knows how to make the best set of signatures and can do so automatically. Alternately, however, this step can also be implemented manually, as noted above.

Step 506 creates an index file comprising the indices created by the user and the signatures created in step 504. This step is typically implemented by the software executing on the user's entertainment system, such as the timecode synchronizing module. Here, the software can bundle together the indices created by the user, the signatures created by the timecode synchronizing module, and any other information such as the recording information that is used to identify the program recording.

Step 508 sends the index file and signature(s) to one or more clients. This step can be implemented in any suitable way. For example, the index file and signature(s) can be sent via email, user download, inside the broadcast message stream, or any other suitable medium. In addition, this step can send any pertinent identifying data that can be used to identify the program of interest.

It should be noted that the receiving client may or may not have previously recorded the same program. Accordingly, the receiving client can receive the index file and signatures before the corresponding program is actually recorded. The receiving client will, however, have to record the corresponding program before many of the steps below are performed, as will become apparent.

Step 510 receives the index file and signature(s). In this example, assume that a user of the receiving client previously recorded the corresponding program. Step 512 associates the index file and the signature(s) with a recorded program on the client system. This step can be implemented by using an identifier that is associated with the received index file and matching the identifier with one that is associated with the recorded program on the client system. There are various program identifiers that can be used in television systems. For example, in the United States, one of the large EPG data providers utilizes an identifier known as a "TMSID". Other identifiers can be utilized as well.

Step 514 processes the recorded program and attempts to find a signature that matches one or more signatures from the index file. This step can be performed in any suitable way. For example, the software in the receiving client can exhaustively scan the program and try to recreate a signature that matches one from the index file. For example, assume that a signature uses closed captioning data and the phrase is "... later tonight we go to Maui to visit George's cousin...". Accordingly, step 514 scans the close captioning data in the receiving client's recording trying to find this same run of words. This step can effectively be performed as a loop that repeats until a match is found. Alternately or additionally, step 514 can process the program data associated with the program of interest and calculate or otherwise generate signatures using the same algorithm that was used to create the signatures in the index file. The signatures in the index file can now be attempted to be matched with the signatures that were just created.

After one or more matching signatures are found, step 516 synchronizes the timecode of the receiving client's program with that of the timecode of the author's recorded program. This step can be performed by determining an offset, as noted above, that is used to translate the author's timecode to the receiving client's timecode.

Alternately, in an embodiment where the signatures are manually created and manually matched, step 514 can be manually performed by, for example, a user scrolling through the first few minutes of their recorded program to find the signature that was manually created by the author.

Step 518 selects a recorded program and enters an enhanced playback mode. This step can be performed by a user of the receiving client after the timecodes have been synchronized. With the timecodes having been synchronized, a user interface can be presented to the user which allows the user to advance to the various indices created by the author.

It is to be appreciated that in some instances, different program recordings of the same program may have discontinuities in their associated timecodes. For example, one broadcaster may drop every 100th video frame to squeeze in a few extra seconds for commercials, while another broadcaster may not drop video frames. In another extreme case, suppose someone sends out an index file for a pay-per-movie. Sometime later on, another person tries to apply that index file to the same movie that is broadcast by a network on Sunday night. In this situation, the network version of the movie will surely have been edited, had commercials inserted, had a few scenes cut, and the like. By continuously trying to match up timecodes, and possibly keying off of the one closest in time to the desired index point, the index points can be kept fairly accurate. This can help to address situations where there are discontinuities in timecodes between different versions of the same program.

Implementation Example

Figure 6:
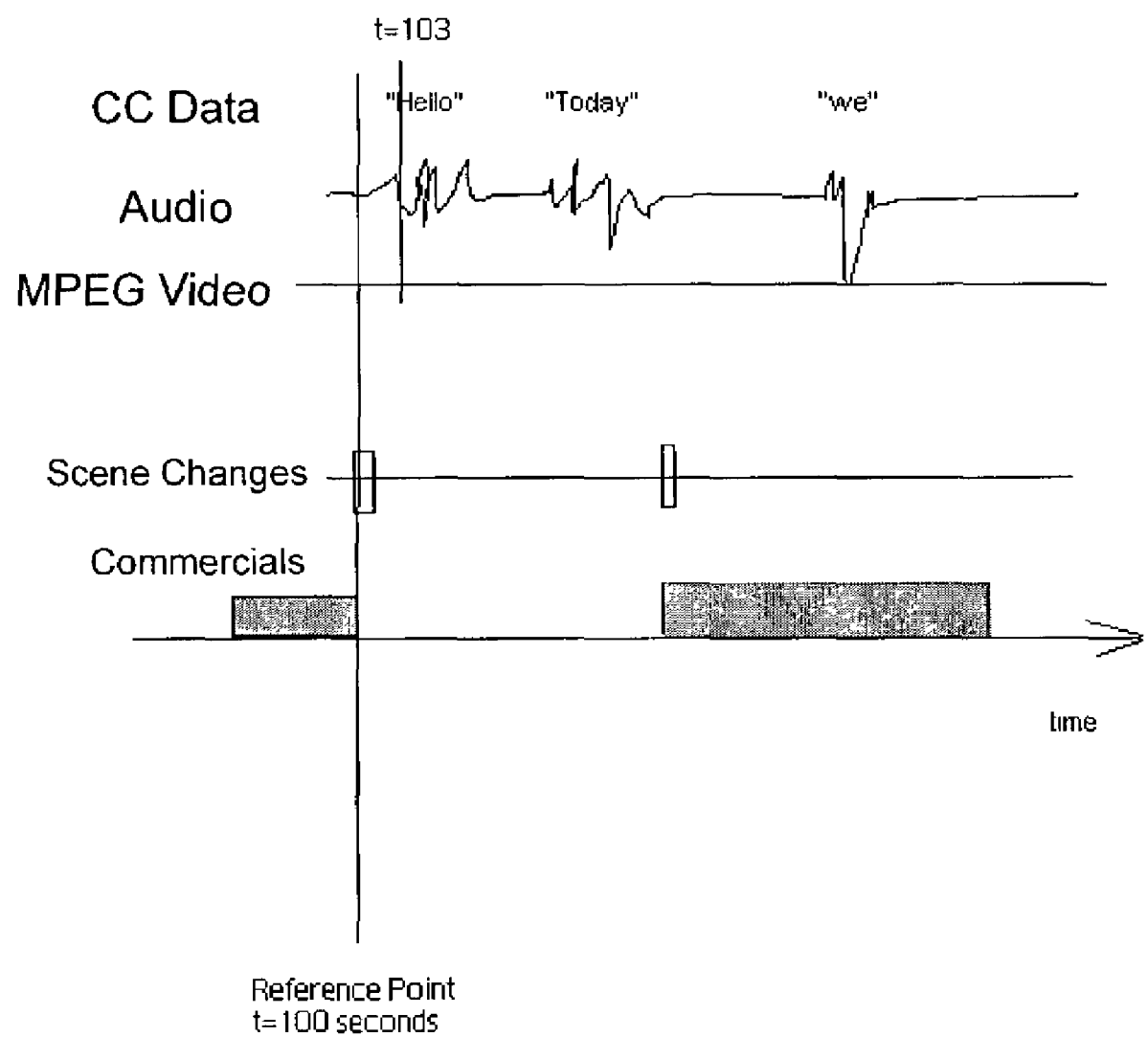
FIG. 6 is a diagram that illustrates one example of how signatures can be used to synchronize timecodes.

FIG. 6 is a diagram that provides a very elementary example of how the embodiments above can be implemented. Here, there are three streams of data that can be parsed—closed caption data, audio data and MPEG data. In this particular case, the author's software used two parsers to create two different signatures. The first parser used the video signal to determine scene changes in the recorded program. It noticed that there is a scene change at t=100 seconds into the recorded program. A second parser used the video and audio stream to parse commercials. It noticed that at time t=100 seconds, the commercial ended and the program began. Since both parsers detect a significant event at t=100 seconds, this point is used as a reference point. Note that a third parser could also be used to parse the closed caption data. This parser could notice that the word "Hello" is mentioned three seconds after the reference point occurs. This parser could also be used to more accurately define the reference point.

The more parsers that are used, the more likely that the author's indices can be synchronized with the receiving client's recorded program.

As another example, consider the following where, for example, only scene transitions are used to define a signature. Suppose an author's timecode has scene transitions at: 15, 20, 45, and 55 seconds. If the receiving client's program has scene transitions at 25, 30, 55, and 65 seconds, then using just one of the scene transitions as a signature would, in this case, be ineffective. Formulating the signature using all four scene transition points, however, can enable a numeric matching algorithm to align (15, 20, 45, 55) with (25, 30, 55, 65) to determine that the offset was +10 seconds.

Exemplary Operating Environment

FIG. 7 illustrates an exemplary environment 700 in which the methods and systems described herein may be implemented. The environment constitutes but one exemplary entertainment system that facilitates distribution of media content and metadata associated with the media content to multiple users. Environment 700 includes one or more content description metadata providers 702, a media content description system 704, one or more program data providers 706, one or more content providers 708, a content distribution system 710, and multiple client devices 712(1), 712(2), ..., 712(N) coupled to the content distribution system 710 via a broadcast network 714.

Content description metadata provider 702 provides content description metadata associated with media content to media content description system 704. Example content description metadata providers can include, without limitation, movie production companies, movie distribution companies, movie critics, television production companies, program distributors, music production companies, and the like. Essentially, any person, company, system, or entity that is able to generate or supply media content description metadata can be considered a content description metadata provider 702.

Media content description system 704 stores media content description metadata associated with a plurality of metadata categories and stores metadata received from one or more metadata providers 702. In one implementation, the media content description system 704 generates composite metadata based on metadata received from a plurality of metadata providers 702. Media content description system 704 provides the media content description metadata to program data provider 706. Typically, such metadata is associated with many different pieces of media content (e.g., movies or television programs).

Program data provider 706 can include an electronic program guide (EPG) database 716 and an EPG server 718. The EPG database 716 stores electronic files of program data which can be used to generate an electronic program guide (or, "program guide"). The program data stored by the EPG database, also termed "EPG data", can include content description metadata and instance description metadata. For example, the EPG database 716 can store program titles, ratings, characters, descriptions, actor names, station identifiers, channel identifiers, schedule information, and the like.

The EPG server 718 processes the EPG data prior to distribution to generate a published version of the EPG data which contains programming information for all channels for one or more days. The processing may involve any number of techniques to reduce, modify, or enhance the EPG data. Such processes can include selection of content, content compression, format modification, and the like. The EPG server 718 controls distribution of the published version of the EPG data from program data provider 706 to the content distribution system 710 using, for example, a file transfer protocol (FTP) over a TCP/IP network (e.g., Internet, UNIX, etc.). Any suitable protocols or techniques can be used to distribute the EPG data.

Content provider 708 includes a content server 720 and stored content 722, such as movies, television programs, commercials, music, and similar media content. Content server 720 controls distribution of the stored content 722 from content provider 708 to the content distribution system 710. Additionally, content server 720 controls distribution of live media content (e.g., content that is not previously stored, such as live feeds) and/or media content stored at other locations.

Content distribution system 710 contains a broadcast transmitter 724 and one or more content and program data processors 726. Broadcast transmitter 724 broadcasts signals, such as cable television signals, across broadcast network 714. Broadcast network 714 can include a cable television network, RF, microwave, satellite, and/or data network, such as the Internet, and may also include wired or wireless media using any broadcast format or broadcast protocol. Additionally, broadcast network 714 can be any type of network, using any type of network topology and any network communication protocol, and can be represented or otherwise implemented as a combination of two or more networks.

Content and program data processor 726 processes the media content and EPG data received from content provider 708 and program data provider 706 prior to transmitting the media content and EPG data across broadcast network 714. A particular content processor may encode, or otherwise process, the received content into a format that is understood by the multiple client devices 712(1), 712(2), ..., 712(N) coupled to broadcast network 714. Although FIG. 7 shows a single program data provider 706, a single content provider 708, and a single content distribution system 710, environment 700 can include any number of program data providers and content providers coupled to any number of content distribution systems.

Content distribution system 710 is representative of a head end service that provides EPG data, as well as media content, to multiple subscribers. Each content distribution system 710 may receive a slightly different version of the EPG data that takes into account different programming preferences and lineups. The EPG server 718 creates different versions of EPG data (e.g., different versions of a program guide) that include those channels of relevance to respective head end services. Content distribution system 710 transmits the EPG data to the multiple client devices 712(1), 712(2), ..., 712(N). In one implementation, for example, distribution system 710 utilizes a carousel file system to repeatedly broadcast the EPG data over an out-of-band channel to the client devices 712.

Client devices 712 can be implemented in multiple ways. For example, client device 712(1) receives broadcast content from a satellite-based transmitter via a satellite dish 728. Client device 712(1) is also referred to as a set-top box or a satellite receiving device. Client device 712(1) is coupled to a television 730(1) for presenting the content received by the client device, such as audio data and video data, as well as a graphical user interface. A particular client device 712 can be coupled to any number of televisions 730 and/or similar devices that can be implemented to display or otherwise render content. Similarly, any number of client devices 712 can be coupled to a television 730.

Client device 712(2) is also coupled to receive broadcast content from broadcast network 714 and communicate the received content to associated television 730(2). Client device 712(N) is an example of a combination television 732 and integrated set-top box 734. In this example, the various components and functionality of the set-top box are incorporated into the television, rather than using two separate devices. The set-top box incorporated into the television may receive broadcast signals via a satellite dish (similar to satellite dish 728) and/or via broadcast network 714. A personal computer may also be a client device 712 capable of receiving and rendering EPG data and/or media content. In alternate implementations, client devices 712 may receive broadcast signals via the Internet or any other broadcast medium.

Each client 712 runs an electronic program guide (EPG) application that utilizes the EPG data. An EPG application enables a TV viewer to navigate through an onscreen program guide and locate television shows of interest to the viewer. With an EPG application, the TV viewer can look at schedules of current and future programming, set reminders for upcoming programs, and/or enter instructions to record one or more television shows.

Exemplary Client Device

The various components and functionality described above can be implemented with a number of individual computers that serve as client devices. FIG. 8 shows components of a typical example of such a computer generally at 800. The components shown in FIG. 8 are only examples, and are not intended to suggest any limitations as to the scope of the claimed subject matter, or the types of clients that can be utilized to implement the inventive embodiments described herein.

Generally, various different general purpose or special purpose computing system configurations can be used. Examples of well known computing systems, environments, and/or configurations that may be suitable for use in implementing the described embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Various functionalities of the different computers can be embodied, in many cases, by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The embodiments described herein includes these and other various types of computer-readable media when such media contain instructions programs, and/or modules for implementing the steps described below in conjunction with a microprocessor or other data processors. The embodiments also include the computer or client device itself when programmed according to the methods and techniques described above.

For purposes of illustration, programs and other executable program components such as the operating system are illustrated herein as discrete blocks, although it is recognized that such programs and components reside at various times in different storage components of the computer, and are executed by the is data processor(s) of the computer.

With reference to FIG. 8, the components of computer 800 may include, but are not limited to, a processing unit 802, a system memory 804, and a system bus 806 that couples various system components including the system memory to the processing unit 802. The system bus 806 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 800 typically includes a variety of computer-readable media. Computer-readable media can be any available media that can be accessed by computer 800 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 800. Communication media typically embodies computer-readable instructions, data structures, program modules or other data in a modulated data signal such as a carrier wave or other transport mechanism and includes any information delivery media. By way of example, and not limitation, communication media includes wired media such as a wired network or direct-wired connection and wireless media such as acoustic, RF, infrared and other wireless media. Combinations of any of the above should also be included within the scope of computer readable media.

The system memory 804 includes computer storage media in the form of volatile and/or nonvolatile memory such as read only memory (ROM) 808 and random access memory (RAM) 810. A basic input/output system 812 (BIOS), containing the basic routines that help to transfer information between elements within computer 800, such as during start-up, is typically stored in ROM 808. RAM 810 typically contains data and/or program modules that are immediately accessible to and/or presently being operated on by processing unit 802. By way of example, and not limitation, FIG. 8 illustrates operating system 814, application programs 816, other program modules 818, and program data 820.

The computer 800 may also include other removable/non-removable, volatile/nonvolatile computer storage media. By way of example only, FIG. 8 illustrates a hard disk drive 822 that reads from or writes to non-removable, nonvolatile magnetic media, a magnetic disk drive 824 that reads from or writes to a removable, nonvolatile magnetic disk 826, and an optical disk drive 828 that reads from or writes to a removable, nonvolatile optical disk 830 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 822 is typically connected to the system bus 806 through a non-removable memory interface such as data media interface 832, and magnetic disk drive 824 and optical disk drive 828 are typically connected to the system bus 806 by a removable memory interface such as interface 834.

The drives and their associated computer storage media discussed above and illustrated in FIG. 8 provide storage of computer-readable instructions, data structures, program modules, and other data for computer 800. In FIG. 8, for example, hard disk drive 822 is illustrated as storing operating system 815, application programs 817, other program modules 819, and program data 821. Note that these components can either be the same as or different from operating system 814, application programs 816, other program modules 818, and program data 820. Operating system 815, application programs 817, other program modules 819, and program data 821 are given different numbers here to illustrate that, at a minimum, they are different copies. A user may enter commands and information into the computer 800 through input devices such as a keyboard 836 and pointing device 838, commonly referred to as a mouse, trackball, or touch pad. Other input devices (not shown) may include a microphone, joystick, game pad, satellite dish, scanner, or the like. These and other input devices are often connected to the processing unit 802 through an input/output (I/O) interface 840 that is coupled to the system bus, but may be connected by other interface and bus structures, such as a parallel port, game port, or a universal serial bus (USB). A monitor 842 or other type of display device is also connected to the system bus 806 via an interface, such as a video adapter 844. In addition to the monitor 842, computers may also include other peripheral output devices 846 (e.g., speakers) and one or more printers 848, which may be connected through the I/O interface 840.

The computer may operate in a networked environment using logical connections to one or more remote computers, such as a remote computing device 850. The remote computing device 850 may be a personal computer, a server, a router, a network PC, a peer device or other common network node, and typically includes many or all of the elements described above relative to computer 800. The logical connections depicted in FIG. 8 include a local area network (LAN) 852 and a wide area network (WAN) 854. Although the WAN 854 shown in FIG. 8 is the Internet, the WAN 854 may also include other networks. Such networking environments are commonplace in offices, enterprise-wide computer networks, intranets, and the like.

When used in a LAN networking environment, the computer 800 is connected to the LAN 852 through a network interface or adapter 856. When used in a WAN networking environment, the computer 800 typically includes a modem 858 or other means for establishing communications over the Internet 854. The modem 858, which may be internal or external, may be connected to the system bus 806 via the I/O interface 840, or other appropriate mechanism. In a networked environment, program modules depicted relative to the computer 800, or portions thereof, may be stored in the remote computing device 850. By way of example, and not limitation, FIG. 8 illustrates remote application programs 860 as residing on remote computing device 850. It will be appreciated that the network connections shown are exemplary and other means of establishing a communications link between the computers may be used.

CONCLUSION

The methods and systems described above can mitigate various errors and problems associated with exchanging index files that are associated with various programs. By enabling timecodes to be synchronized as between different recorded versions of the same program, the user experiences across a large number of recorded programs can be more standardized and uniform.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   creating one or more indices associated with a program, the one or more indices defining one or more regions of interest of the program marked by a user on a first recording of the program recorded by a first entertainment system;
   processing program data associated with the first recording of the program recorded on the first entertainment system sufficient to create one or more signatures, each of the one or more signatures defining a point of reference in the program for synchronizing a first timecode associated with the first recording of the program with one or more timecodes associated with one or more recordings of the program on one or more additional entertainment systems;
   creating an index file that contains the one or more signatures and the one or more indices; and
   sending the index file containing the one or more signatures and the one or more indices to the one or more additional entertainment systems; wherein:
   the one or more signatures are configured to be used by the one or more additional entertainment systems to synchronize respective timecodes of respective recordings of the program recorded by the one or more additional entertainment systems with the timecode of the first recording of the program recorded by the first entertainment system; and
   the one or more indices are configured to be used by the one or more additional entertainment systems to output the one or more regions of interest of the program marked by the user of the first entertainment system.

2. The method of claim 1, wherein the act of processing comprises processing video data associated with the program to create at least one signature from the video data.

3. The method of claim 1, wherein the act of processing comprises processing audio data associated with the program to create at least one signature from the audio data.

4. The method of claim 1, wherein the act of processing comprises processing closed caption data associated with the program to create at least one signature from the closed caption data.

5. The method of claim 1, wherein the act of processing comprises processing multiple different types of program data associated with the program to create at least two signatures.

6. The method of claim 1, wherein the act of processing comprises processing program data other than video data associated with the program to create at least one signature.

7. The method of claim 1, wherein the act of processing comprises processing multiple different types of program data other than video data associated with the program to create at least one signature.

8. The method of claim 1, wherein the act of processing comprises processing program data other than audio data associated with the program to create at least one signature.

9. The method of claim 1, wherein the act of processing comprises processing multiple different types of program data other than audio data associated with the program to create at least one signature.

10. The method of claim 1, wherein the act of processing comprises processing program data other than closed caption data associated with the program to create at least one signature.

11. The method of claim 1, wherein the act of processing comprises processing multiple different types of program data other than closed caption data associated with the program to create at least one signature.

12. A method comprising:

creating one or more indices associated with a program, the one or more indices defining one or more regions of interest of the program marked by a user on a first recording of the program recorded by a first entertainment system;

processing program data associated with the first recording of the program recorded on the first entertainment system sufficient to create one or more signatures, each of the one or more signatures defining a point of reference in the program for synchronizing a timecode associated with the first recording of the program recorded on the first entertainment system, with one or more timecodes associated with one or more recordings of the program on one or more additional entertainment systems;

creating an electronically-sendable index file comprising the one or more signatures and the one or more indices; and sending the electronically-sendable index file containing the one or more signatures and the one or more indices to the one or more additional entertainment systems; wherein:

the one or more signatures are configured to be used by the one or more additional entertainment systems to synchronize respective timecodes of respective recordings of the program recorded by the one or more additional entertainment systems with the timecode of the first recording of the program recorded by the first entertainment system; and the one or more indices are configured to be used by the one or more additional entertainment systems to output the one or more regions of interest of the program marked by the user of the first entertainment system.

13. The method of claim 12, wherein the act of processing comprises processing video data associated with the program to create at least one signature from the video data.

14. The method of claim 12, wherein the act of processing comprises processing audio data associated with the program to create at least one signature from the audio data.

15. The method of claim 12, wherein the act of processing comprises processing closed caption data associated with the program to create at least one signature from the closed caption data.

16. The method of claim 12, wherein the act of processing comprises processing multiple different types of program data associated with the program to create at least two signatures.

17. The method of claim 12, wherein the act of processing comprises processing program data other than video data associated with the program to create at least one signature.

18. The method of claim 12, wherein the act of processing comprises processing multiple different types of program data other than video data associated with the program to create at least one signature.

19. The method of claim 12, wherein the act of processing comprises processing program data other than audio data associated with the program to create at least one signature.

20. The method of claim 12, wherein the act of processing comprises processing multiple different types of program data other than audio data associated with the program to create at least one signature.

21. The method of claim 12, wherein the act of processing comprises processing program data other than closed caption data associated with the program to create at least one signature.

22. The method of claim 12, wherein the act of processing comprises processing multiple different types of program data other than closed caption data associated with the program to create at least one signature.

23. A system comprising:

a timecode synchronizing module configured to enable creation of one or more index files that are associated with a first recording of a program recorded by a first entertainment system, wherein each of the one or more index files include: (i) one or more indices defining one or more regions of interest of the program marked by a user on the first recording of the program recorded by the first entertainment system, and (ii) one or more signatures, each of the one or more signatures defining one or more points of reference in the program; and wherein the timecode synchronizing module comprises:

a signature creation component configured to process program data associated with the first recording of the program and create the one or more signatures defining the one or more points of reference in the program for synchronizing a timecode associated with the first recording of the program with one or more timecodes associated with one or more different recordings of the program recorded by one or more additional entertainment systems; and a signature matching component that is configured to attempt to match signatures associated with index files that are received from one or more other entertainment systems, with portions of the program recorded on the first entertainment system;

wherein the one or more index files that are associated with the first recording of the program are configured to be used by the one or more additional entertainment systems to synchronize respective timecodes of the additional entertainment systems with the timecode associated with the first recording of the program and to output the one or more regions of interest of the program marked by the user of the first entertainment system.

24. The system of claim 23, wherein the signature creation component is configured to process video data associated with recorded programs to create at least one signature from the video data.

25. The system of claim 23, wherein the signature creation component is configured to process audio data associated with recorded programs to create at least one signature from the audio data.

26. The system of claim 23, wherein the signature creation component is configured to process closed caption data associated with recorded programs to create at least one signature from the closed caption data.

27. The system of claim 23, wherein the signature creation component is configured to process multiple different types of data associated with recorded programs to create at least two signatures from the data.

28. The system of claim 23, wherein the signature creation component is configured to process multiple different types of program data other than video data associated with recorded programs to create at least one signature from the program data.

29. The system of claim 23, wherein the signature creation component is configured to process multiple different types of program data other than audio data associated with recorded programs to create at least one signature from the program data.

30. The system of claim 23, wherein the signature creation component is configured to process multiple different types of program data other than closed caption data associated with recorded programs to create at least one signature from the program data.

31. An entertainment system embodying the system of claim 23.

32. An entertainment system comprising:
one or more processors;
one or more computer-readable media embodying:
a timecode synchronizing module configured to enable a user to create one or more index files that are associated with a first recording of a program that is saved on the entertainment system, wherein each of the one or more index files includes: (i) one or more indices defining one or more regions of interests of the program marked by the user on the first recording of the program recorded by the entertainment system, and (ii) one or more signatures, each of the signatures defining one or more points of reference in the program; and wherein the timecode synchronizing module comprises:
a user interface component configured to allow the user to select and index on the entertainment system the one or more regions of interest of the first recording of the program;
a signature creation component configured to process program data associated with the first recording of the program and create the one or more signatures that define the one or more points of reference for synchronizing a timecode associated with the first recording of the program on the entertainment system, with one or more timecodes associated with one or more other recordings of the program recorded on one or more other entertainment systems;
a signature matching component that is configured to attempt to match signatures associated with programs for which index files are received, with portions of corresponding programs that are recorded on the entertainment system; wherein
the timecode synchronizing module is configured to locate one or more indices in a recorded program as a result of one or more matched signatures in order to output one or more regions of interest associated with the located one or more indices.

33. The entertainment system of claim 32, wherein the signature creation component is configured to process video data associated with recorded programs to create at least one signature from the video data.

34. The entertainment system of claim 32, wherein the signature creation component is configured to process audio data associated with recorded programs to create at least one signature from the audio data.

35. The entertainment system of claim 32, wherein the signature creation component is configured to process closed caption data associated with recorded programs to create at least one signature from the closed caption data.

36. The entertainment system of claim 32, wherein the signature creation component is configured to process multiple different types of data associated with recorded programs to create at least two signatures from the data.

37. A system comprising:
a timecode synchronizing module configured to enable a user to create one or more index files that are associated with a program that is saved on a user's entertainment system, wherein each of the one or more index files contains one or more indices and one or more signatures;
a user interface component configured to allow the user to select and index different portions of the saved program with the one or more indices; and
a signature creation component configured to process program data associated with the program that is saved on the user's entertainment system and create the one or more signatures that are utilized as points of reference for synchronizing a timecode associated with the program saved on another entertainment system with a timecode associated with the program saved on the user's entertainment system, the signature creation component comprising one or more parsers for parsing program data to create the one or more signatures; and
wherein the one or more index files are configured to be used by the another entertainment system to output the selected and indexed portions of the saved program on the another entertainment system.

38. The system of claim 37 further comprising:
a signature matching component that is configured to attempt to match signatures associated with index files that are received from an entertainment system that is not the user's entertainment system, with portions of programs on the user's entertainment system; and
the timecode synchronizing module being configured to attempt to synchronize timecodes on other recorded programs that correspond to the programs from which the signatures are created.

39. The system of claim 37, wherein the one or more parsers comprise at least one video data parser.

40. The system of claim 37, wherein the one or more parsers comprise at least one video data parser configured to create multiple different signatures from the same recorded program.

41. The system of claim 37, wherein the one or more parsers comprise at least one audio data parser.

42. The system of claim 37, wherein the one or more parsers comprise at least one audio data parser configured to create multiple different signatures from the same recorded program.

43. The system of claim 37, wherein the one or more parsers comprise at least one closed caption data parser.

44. The system of claim 37, wherein the one or more parsers comprise at least one closed caption data parser configured to create multiple different signatures from the same recorded program.

45. The system of claim 37, wherein the one or more parsers comprise multiple parsers selected from a group of parsers comprising a video data parser, an audio data parser, and a closed caption data parser.

46. The system of claim 37, wherein the one or more parsers comprise multiple parsers selected from a group of parsers comprising a video data parser, an audio data parser, and a closed caption data parser, individual parsers being configured to create multiple different signatures from the same recorded program.

47. An entertainment system embodying the system of claim 37.

48. A method comprising:
recording a program on a user's entertainment system, the recording of the program being associated with a timecode;
presenting a user interface to enable a user to create one or more indices associated with one or more locations in the recorded program;
creating one or more signatures using program data associated with the recorded program;
creating an index file comprising the one or more indices created by the user and the one or more signatures; and
sending the index file and program-identifying data for receipt by one or more client entertainment systems, wherein:
the one or more signatures are used by the one or more client entertainment systems to synchronize the timecode associated with the program recorded by the user's entertainment system with respective timecodes of respective recordings by the one or more clients entertainment systems; and
the one or more indices are used by the one or more client entertainment systems to output the one or more locations specified by the user on the one or more client entertainment systems.

49. The method of claim 48, wherein the act of creating the one or more signatures can be performed by enabling the user to manually create the one or more signatures.

50. The method of claim 48, wherein the act of sending comprises emailing the index file, signature(s), and program-identifying data.

51. The method of claim 48, wherein the act of sending comprises broadcasting the index file, signature(s), and program-identifying data.

52. The method of claim 48, wherein the act of creating one or more signatures comprises processing video data associated with the program to create at least one signature from the video data.

53. The method of claim 48, wherein the act of creating one or more signatures comprises processing audio data associated with the program to create at least one signature from the audio data.

54. The method of claim 48, wherein the act of creating one or more signatures comprises processing closed caption data associated with the program to create at least one signature from the closed caption data.

55. The method of claim 48, wherein the act of creating one or more signatures comprises processing multiple different types of program data associated with the program to create at least two signatures.

56. The method of claim 48, wherein the act of creating one or more signatures comprises processing program data other than video data associated with the program to create at least one signature.

57. The method of claim 48, wherein the act of creating one or more signatures comprises processing program data other than audio data associated with the program to create at least one signature.

58. The method of claim 48, wherein the act of creating one or more signatures comprises processing program data other than closed caption data associated with the program to create at least one signature.

59. An entertainment system embodying one or more computer-readable media having instructions which, when executed by one or more processors, cause the one or more processors to implement the method of claim 48.

60. An entertainment system comprising:
one or more processors;
one or more computer-readable media;
instructions in the computer-readable media which, when executed by the one or more processors, cause the one or more processors to:
record a first program associated with a timecode on a user's entertainment system;
present a user interface to enable the user to create one or more indices associated with one or more locations of interest in the first recorded program on the user's entertainment system;
create one or more signatures using program data associated with the first recorded program on the user's entertainment system, said first program data comprising program data selected from a group of data comprising video data, audio data and closed caption data;
create an index file comprising the one or more indices created by the user in the first recorded program and the one or more signatures associated with the first recorded program; and
send the index file for receipt by one or more client entertainment systems, wherein:
the one or more signatures are used by the one or more client entertainment systems to synchronize the timecode associated with the first recorded program on the user's entertainment system with respective timecodes of respective recordings on the one or more client entertainment systems; and
the one or more indices are used by the one or more client entertainment systems to output the locations of interest identified by the user on the one or more client entertainment systems.

61. The entertainment system of claim 60, wherein the instructions cause the one or more processors to create multiple different signatures.

62. The entertainment system of claim 60, wherein the instructions cause the one or more processors to create multiple different types of signatures.

63. A method comprising:
receiving, at a first entertainment system, at least one index file and one or more signatures associated with the one index file, the one index file and associated signatures being associated with a program recorded by a user on a second entertainment system, the one index file comprising at least one index that points to a location of interest in the program, the location of interest having been specified by the user on the second entertainment system;

associating the index file and associated signatures with a recorded program on the first entertainment system, the recorded program on the first entertainment system being a different recording of the program that is recorded on the second entertainment system;

processing the recorded program on the first entertainment system to attempt to find a program portion that matches one or more signatures associated with the index file received at the first entertainment system;

responsive to finding a matching program portion, synchronizing a timecode associated with the recorded program on the first entertainment system with a timecode associated with the program recorded by the user on the second entertainment system with which the one or more signatures are associated; and outputting, at the first entertainment system and with use of the at least one index, the location of interest specified by the user on the second entertainment system.

64. The method of claim 63, wherein the act of processing the recorded program on the first entertainment system comprises creating, with at least one algorithm, one or more signatures using the recorded program, said algorithm comprising a same algorithm that was used to create said one or more signatures that are associated with the index file.

65. The method of claim 64, wherein the act of creating one or more signatures comprises processing video data associated with the corresponding program to create at least one signature from the video data.

66. The method of claim 64, wherein the act of creating one or more signatures comprises processing audio data associated with the corresponding program to create at least one signature from the audio data.

67. The method of claim 64, wherein the act of creating one or more signatures comprises processing closed caption data associated with the corresponding program to create at least one signature from the closed caption data.

68. The method of claim 64, wherein the act of creating one or more signatures comprises processing multiple different types of program data associated with the corresponding program to create at least two signatures.

69. The method of claim 64, wherein the act of creating one or more signatures comprises processing program data other than video data associated with the corresponding program to create at least one signature.

70. The method of claim 64, wherein the act of creating one or more signatures comprises processing program data other than audio data associated with the corresponding program to create at least one signature.

71. The method of claim 64, wherein the act of creating one or more signatures comprises processing program data other than closed caption data associated with the corresponding program to create at least one signature.

72. An entertainment system embodying one or more computer-readable media having instructions which, when executed by one or more processors, cause the one or more processors to implement the method of claim 63.

* * * * *